US009253358B2

(12) United States Patent
Murakami (10) Patent No.: US 9,253,358 B2
(45) Date of Patent: Feb. 2, 2016

(54) LIGHT GUIDE UNIT THAT GUIDES LIGHT IN AN ORIGINAL DOCUMENT READING APPARATUS

(71) Applicant: CANON KABUSHIKI KAISHA, Tokyo (JP)

(72) Inventor: Ayumu Murakami, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/827,386

(22) Filed: Mar. 14, 2013

(65) Prior Publication Data
US 2013/0278975 A1 Oct. 24, 2013

(30) Foreign Application Priority Data

Apr. 18, 2012 (JP) .................. 2012-095019

(51) Int. Cl.
*H04N 1/04* (2006.01)
*H04N 1/028* (2006.01)
*F21V 8/00* (2006.01)
*H04N 1/00* (2006.01)
*H04N 1/03* (2006.01)

(52) U.S. Cl.
CPC .......... *H04N 1/02855* (2013.01); *G02B 6/0001* (2013.01); *H04N 1/00989* (2013.01); *H04N 1/02865* (2013.01); *G02B 6/0045* (2013.01); *G02B 6/0088* (2013.01); *H04N 1/0305* (2013.01)

(58) Field of Classification Search
CPC ................................. H04N 1/02855
See application file for complete search history.

(56) References Cited

U.S. PATENT DOCUMENTS

| 4,783,700 | A | * | 11/1988 | Nagane | 358/482 |
| 7,463,392 | B2 | | 12/2008 | Yamamoto et al. | 358/496 |
| 7,515,312 | B2 | | 4/2009 | Murakami et al. | 358/461 |
| 7,755,812 | B2 | | 7/2010 | Oshida et al. | 358/496 |
| 7,760,403 | B2 | * | 7/2010 | Sakurai | 358/484 |
| 7,784,989 | B2 | * | 8/2010 | Shin | 362/628 |
| 7,847,983 | B2 | | 12/2010 | Murakami | 358/474 |
| 7,903,298 | B2 | * | 3/2011 | Sawada et al. | 358/484 |
| 8,064,105 | B2 | | 11/2011 | Murakami et al. | 358/461 |
| 8,422,073 | B2 | | 4/2013 | Murakami et al. | 358/1.9 |
| 2007/0165421 | A1 | * | 7/2007 | Sakai et al. | 362/612 |
| 2008/0112166 | A1 | | 5/2008 | Kakizaki et al. | 362/245 |
| 2010/0129116 | A1 | * | 5/2010 | Shinkawa | 399/200 |
| 2010/0232834 | A1 | * | 9/2010 | Ishida | 399/144 |
| 2011/0228353 | A1 | | 9/2011 | Okamoto | 358/475 |
| 2011/0286057 | A1 | * | 11/2011 | Nagamochi et al. | 358/484 |
| 2014/0332667 | A1 | * | 11/2014 | Aramaki et al. | 250/208.1 |
| 2015/0116791 | A1 | * | 4/2015 | Tochigi | H04N 1/1039 358/475 |

FOREIGN PATENT DOCUMENTS

JP 2008172565 A * 7/2008
JP 4788577 B 10/2011

OTHER PUBLICATIONS

U.S. Appl. No. 13/827,586, filed Mar. 14, 2013; Inventor: Ayumu Murakami.

* cited by examiner

*Primary Examiner* — Cheukfan Lee
(74) *Attorney, Agent, or Firm* — Fitzpatrick, Cella, Harper & Scinto (57) ABSTRACT

A plurality of LEDs (light emitting diodes) are mounted upon a metallic plate member, and thus heat from the plurality of LEDs is transmitted to the metallic plate member. The plate member functions as a heat radiating plate. In addition, a light guide is fixed to the plate member so that a surface of the light guide and a surface of the plate member that face each other are parallel.

11 Claims, 13 Drawing Sheets

LIGHT GUIDE UNIT THAT GUIDES LIGHT IN AN ORIGINAL DOCUMENT READING APPARATUS

BACKGROUND OF THE INVENTION

1. Field of the Invention

The present invention relates to light guide units that guide light in original document reading apparatuses.

2. Description of the Related Art

Original document reading apparatuses such as copy machines, facsimiles, image scanners, and so on typically read an image of an original document by illuminating the original document, which has been placed on a platen glass. US2008/0112166 discloses mounting a plurality of LEDs (light-emitting diodes) upon a long, thin printed wiring substrate in the longitudinal direction thereof, and illuminating an original document by converging the light from the plurality of LEDs using a light guide.

However, the following problems are present in the invention disclosed in the document US2008/0112166. As illustrated in FIGS. 1 and 2 of the document US2008/0112166, a light guide is formed of a transparent plastic, has an unevenly-thick cross-sectional shape and is long in the longitudinal direction (an X axis direction, in FIGS. 1 and 2). Accordingly, with the invention disclosed in the document US2008/0112166, a high degree of warpage will occur in the light guide in a Z axis direction and a Y axis direction, even if formation conditions (mold temperature conditions, plastic extrusion conditions, and so on) are optimal. The warpage changes illumination characteristics, and causes fogging, shininess, and so on. Fogging is a phenomenon that arises when an illumination light amount is insufficient. The occurrence of fogging produces areas in an image that are darker than their surroundings. Meanwhile, shininess is a phenomenon that occurs when a location where the illumination light amount peaks is skewed from a design location.

Figure 12A:
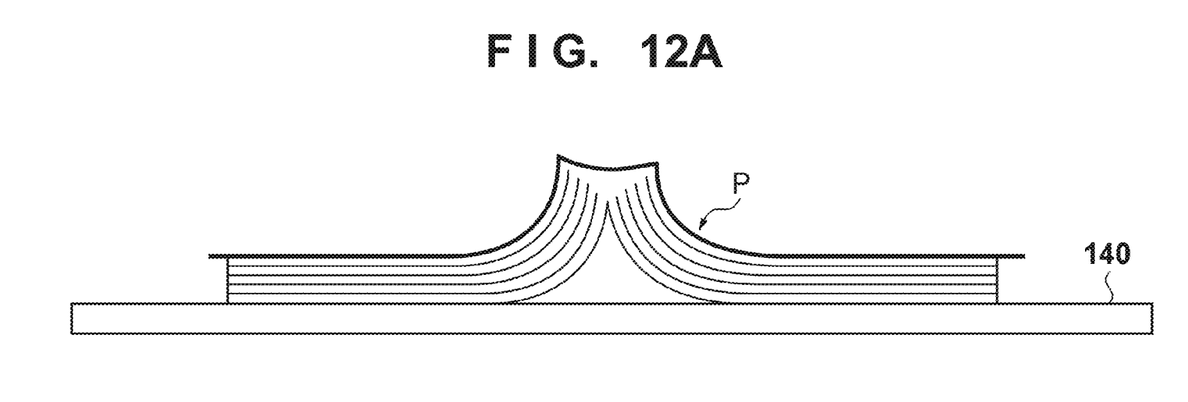
FIGS. 12A, 12B, 12C, and 12D are diagrams illustrating fogging and shininess.
Figure 12B:
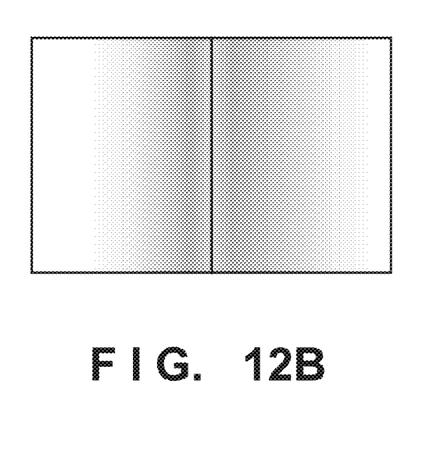

This becomes particularly apparent when reading a facing thick original document, at areas where the distance from the platen glass to the original document is not constant. FIGS. 12A to 12D illustrate an example of fogging and shininess occurring when reading a facing thick original document such as a book or the like. As shown in FIG. 12A, when a spread thick original document P is placed upon a platen glass 140, the central area of the original document is distanced from the platen glass 140. As shown in FIG. 12B, the reading result designed to be obtained is obtained in the case where the light guide is not warped.

Figure 12C:
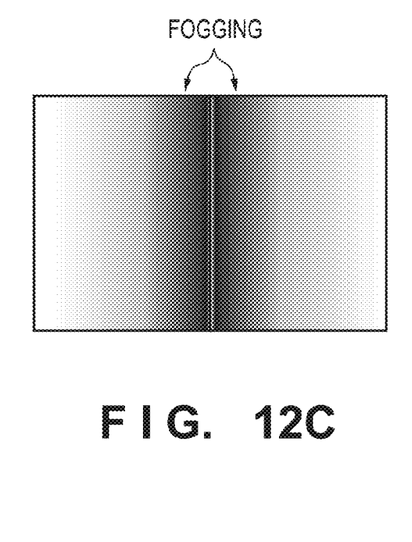
Figure 12D:
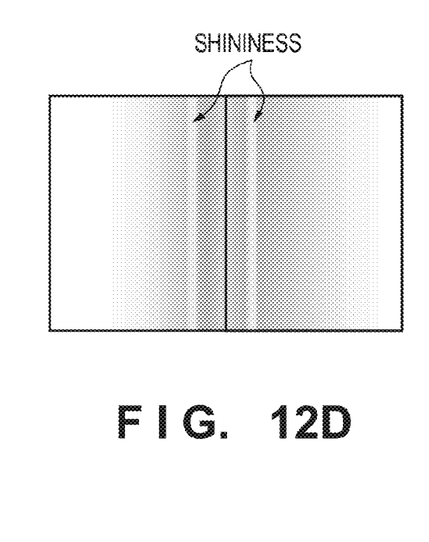

However, if the light guide is warped, there are cases where fogging will occur in the center of the image, as shown in FIG. 12C, or shininess will occur in the vicinity of the center of the image, as shown in FIG. 12D.

Furthermore, recently, the light amounts of LEDs are increasing due to increases in speeds, increases in image quality, and so on of original document reading apparatuses. A rise in the temperature of an LED shortens the LED's lifespan and also leads to a drop in a light-emission amount, and it is thus necessary to efficiently radiate the heat. With the invention disclosed in The document US2008/0112166, the LEDs and the light guide are provided upon a printed wiring substrate, thus making it easy for a reduction in the lifespan of the LEDs and a drop in the light-emission amounts thereof to occur.

SUMMARY OF THE INVENTION

The present invention efficiently suppresses a rise in the temperature of a light emitting element while suppressing warpage in a light guide.

An embodiment of the present invention provides an original document reading apparatus comprising the following elements. An illumination unit is configured to illuminate a surface of the original document to be read. A photoelectric conversion element is configured to convert reflected light from the original document illuminated by the illumination unit into an electrical signal. The illumination unit may include the following element. A metallic substrate. A plurality of light emitting elements mounted in an array on the metallic substrate. A light guide is configured to guide light output from the plurality of light emitting elements toward the original document. A light incident surface of the light guide is configured to face light-emitting surfaces of the plurality of light emitting elements. The light guide is fixed to the metallic substrate.

Further features of the present invention will become apparent from the following description of exemplary embodiments (with reference to the attached drawings).

DESCRIPTION OF THE EMBODIMENTS

Figure 1:
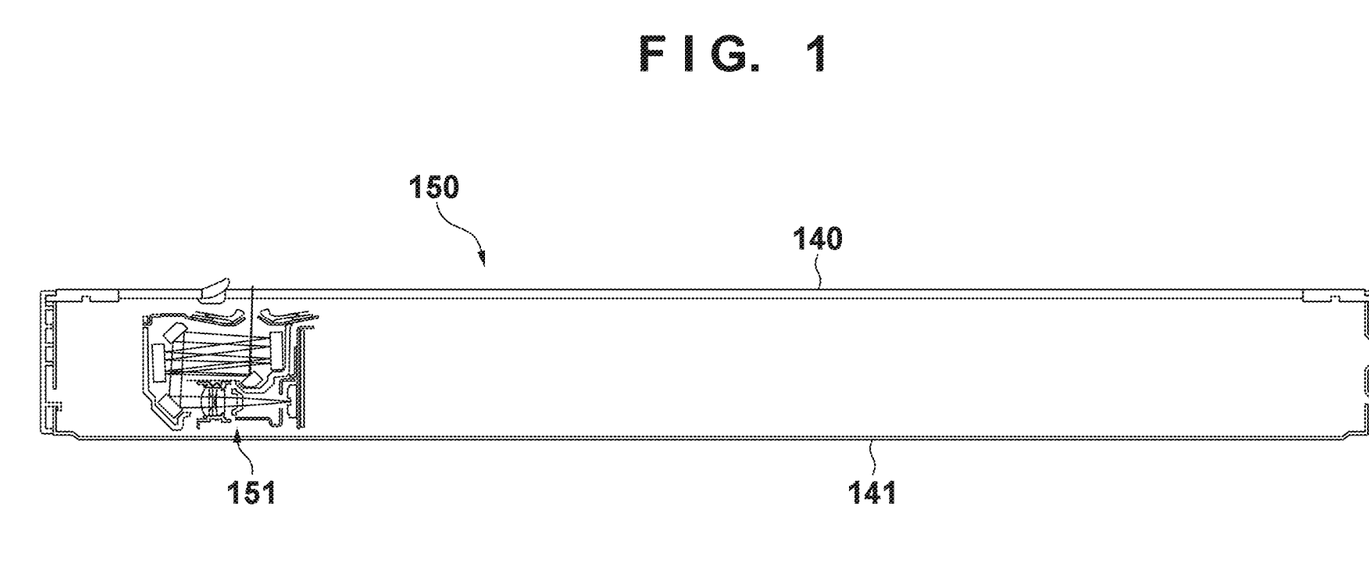
FIG. 1 is an overall cross-sectional view of a reader section.

As shown in FIG. 1, a reader section 150 of an original document reading apparatus includes an optical box 151, a reader frame 141, and a platen glass 140. The optical box 151 is linked to a motor (not shown) via wires (also not shown), and due to rotation of the motor, moves parallel to the platen glass 140. Through this, the optical box 151 optically scans an original document placed upon the platen glass 140 in a sub scanning direction. Accordingly, the sub scanning direction is parallel to the direction in which the optical box 151 moves.

Figure 2:
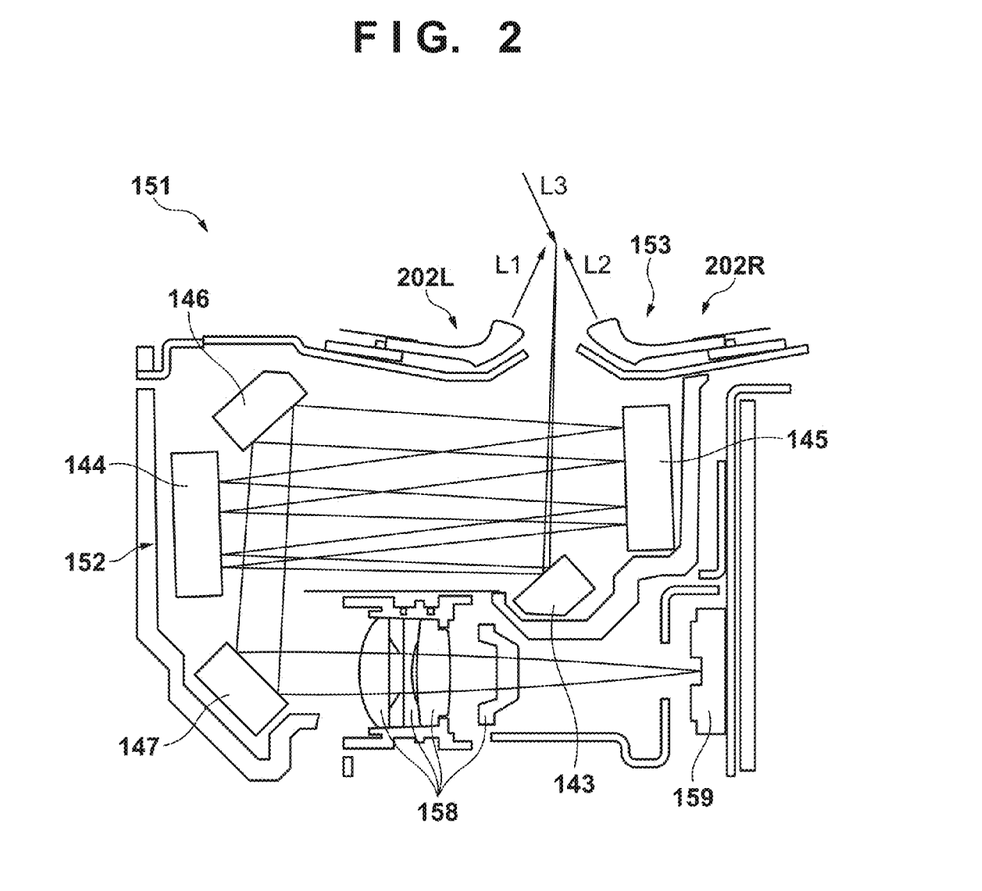
FIG. 2 is an overall cross-sectional view of an optical box.

As shown in FIG. 2, the optical box 151 includes a box frame 152 that supports optical components and the like. An illumination unit 153 illuminates a surface of the original document to be read. The illumination unit 153 includes two light guide units 202L and 202R. Light L1 output from the light guide unit 202L and light L2 output from the light guide unit 202R are reflected by the surface of the original document to be read. Reflected light L3 from the original document forms an image on a CCD (charge coupled device) 159 via mirrors 143, 144, 145, 146, and 147 and a plurality of lenses 158. The CCD 159 is a photoelectric conversion element, and receives the reflected light L3 based on an image in the original document, converts the received light to an electric signal, and outputs the signal as an electronic image signal.

Figure 3A:
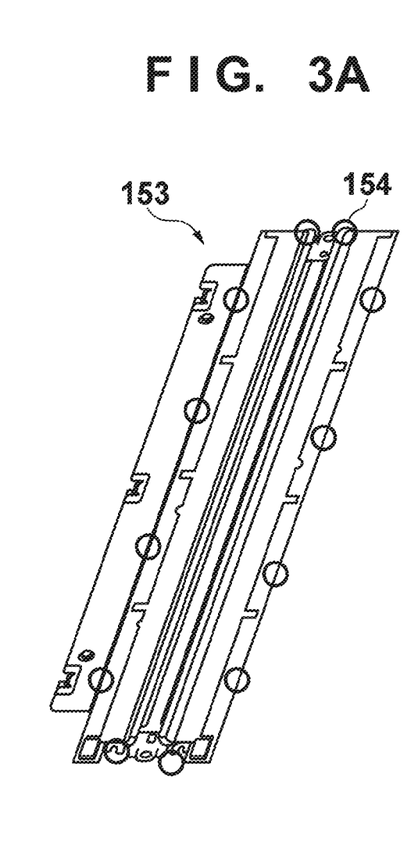
FIGS. 3A, 3B, and 3C are diagrams illustrating an illumination unit.
Figure 3B:
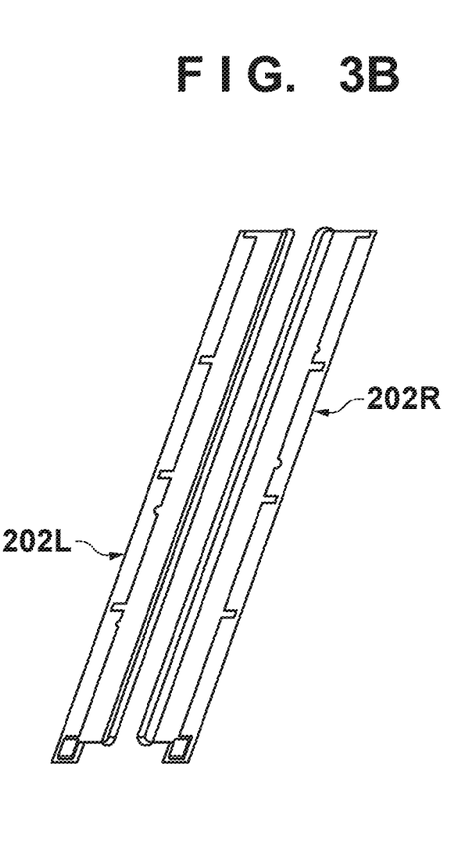
Figure 3C:
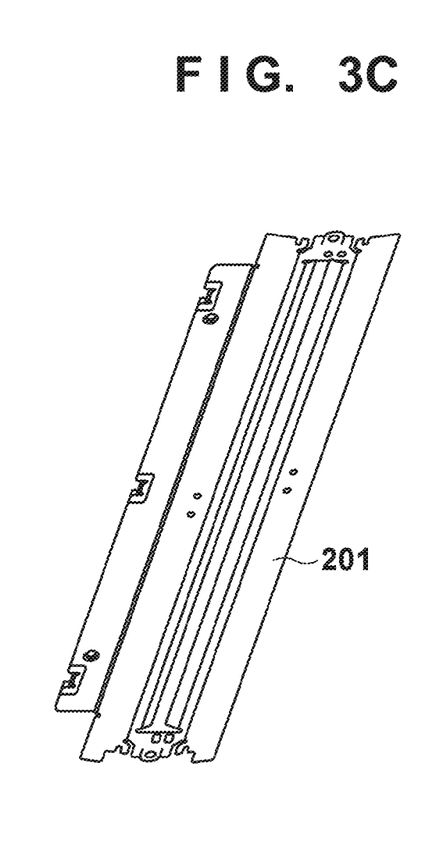

FIG. 3A illustrates the illumination unit 153 as a whole. The illumination unit 153 includes a base portion 201, shown in FIG. 3C and configured of a metallic plate member, and the light guide units 202L and 202R shown in FIG. 3B. The light guide units 202L and 202R are aligned relative to the base portion 201 and fixed thereupon when assembling the illumination unit so that the optical axis of the light L1 output from the light guide unit 202L and the optical axis of the light L2 output from the light guide unit 202R are each in desired positions. By adjusting the positions of the light guide units 202L and 202R relative to the base portion 201 as appropriate, the optical axis of the light L1 and the optical axis of the light L2 can be adjusted, making it possible to set the light amount at an original document reading position to a desired light amount. Accordingly, the occurrence of shininess, fogging, and so on can be suppressed. Circles 154 in FIG. 3A indicate positions that are fixed with a UV bonding agent.

Figure 4A:
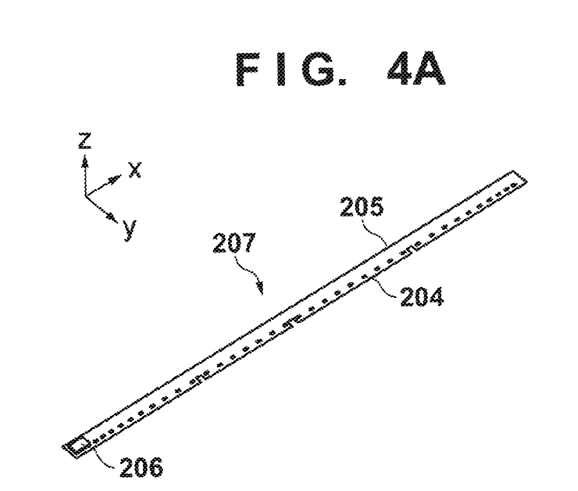
FIGS. 4A, 4B, 4C, and 4D are diagrams illustrating a light guide unit.

FIGS. 4A through 4D illustrate the light guide unit 202L. As shown in FIG. 4A, an LED substrate 207 includes a plurality of LEDs 204 mounted along a straight line, a metallic plate member 205, and a connector portion 206 that is connected to the LEDs via electrical wires.

The LED substrate 207 is configured of a metal because metal accelerates the radiation of heat and suppresses a rise in the temperature of the LEDs. Note that a thermally conductive sheet, a silicone paste, or the like may be arranged between the top surface (contact surface) of the plate member 205 and the bottom surfaces (contact surfaces) of the plurality of LEDs 204 in order to accelerate the radiation of heat.

For example, aluminum, which has excellent heat radiation properties and processability, can be used as the material of the plate member 205. A substrate configured of another metal may be employed as the plate member 205 as long as the metal is a material capable of efficiently radiating heat from the plurality of LEDs 204 (examples: an aluminum alloy, iron, copper, stainless steel). The plurality of LEDs 204 are mounted as an array (in a single straight line) along the longitudinal direction (x direction) of the plate member 205. The direction in which light is output from each of the plurality of LEDs 204 is a y direction. The connector portion 206 that is connected to wiring for supplying power to the plurality of LEDs 204 is provided at an end of the plate member 205 in the longitudinal direction thereof.

Figure 4B:
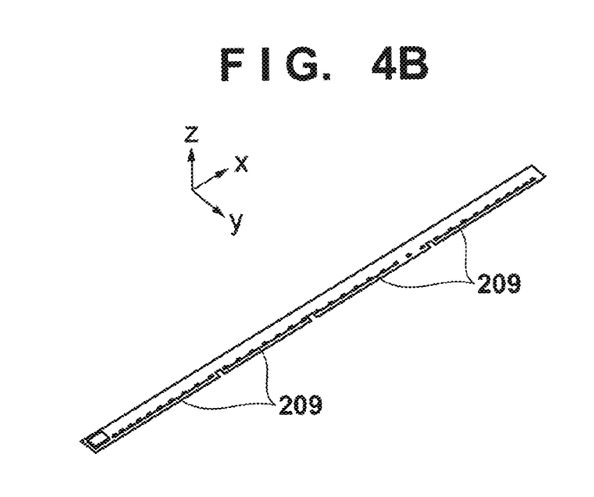

As shown in FIG. 4B, double-stick tape 209 is affixed to the surface of the LED substrate 207 on which the LEDs 204 are mounted when assembling the LED substrate 207. This double-stick tape 209 is an adhesive member for applying and fixing a light guide 208 to the plate member 205.

The double-stick tape 209 has a long, thin shape following the longitudinal direction of the LED substrate 207. The light guide 208 is fixed upon the LED substrate 207 using the double-stick tape 209 so that light-emitting surfaces 241 of the plurality of LEDs 204 and a light incident surface 281 of the light guide 208 face each other and are close to each other. The light guide 208 is configured of a light-transmissive plastic such as an acryl, FRP, or the like. Because the light guide 208 is stuck and fixed to the LED substrate 207, which is configured of a metallic plate member that is more rigid than the plastic light guide, it is possible to correct warpage in the light guide 208 if such warpage has occurred.

Figure 4C:
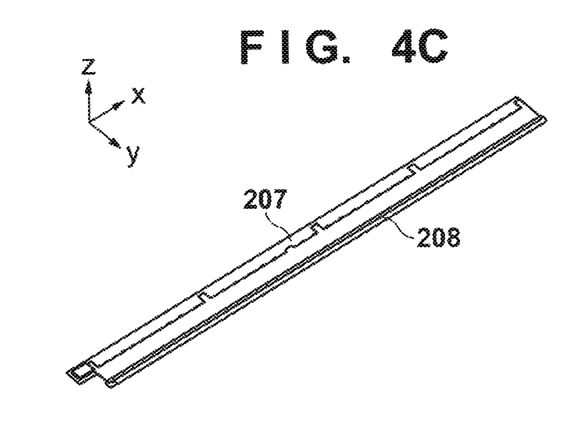

FIG. 4C illustrates a state in which the light guide 208 has been fixed upon the LED substrate 207. The plurality of LEDs 204 are side view-type LEDs whose light-emitting surfaces 241 face the light guide 208. As shown in FIG. 4A, the light guide unit 202L is a unit that integrates the LED substrate 207 having the metallic plate member 205, the plurality of LEDs 204, and the light guide 208. The light guide unit 202R has the same configuration. In addition, as indicated by the dotted line in FIG. 4D, light emitted from the plurality of LEDs 204 incidents on/enters the light incident surface 281, is reflected within the light guide 208 (by a border surface such as a reflecting portion 282), and is emitted from a light exit portion 283. Accordingly, the light guide 208 functions as a light guiding member that guides light output from the LEDs 204, which correspond to a plurality of light emitting elements, toward the original document.

As shown in FIG. 2, the light guide units 202L and 202R have shapes that are symmetrical relative to the optical axis of the reflected light L3. Accordingly, the same component can be used for the light guide 202L and the light guide 202R, and thus the light guide units can be mass-produced as identical components.

Figure 5:
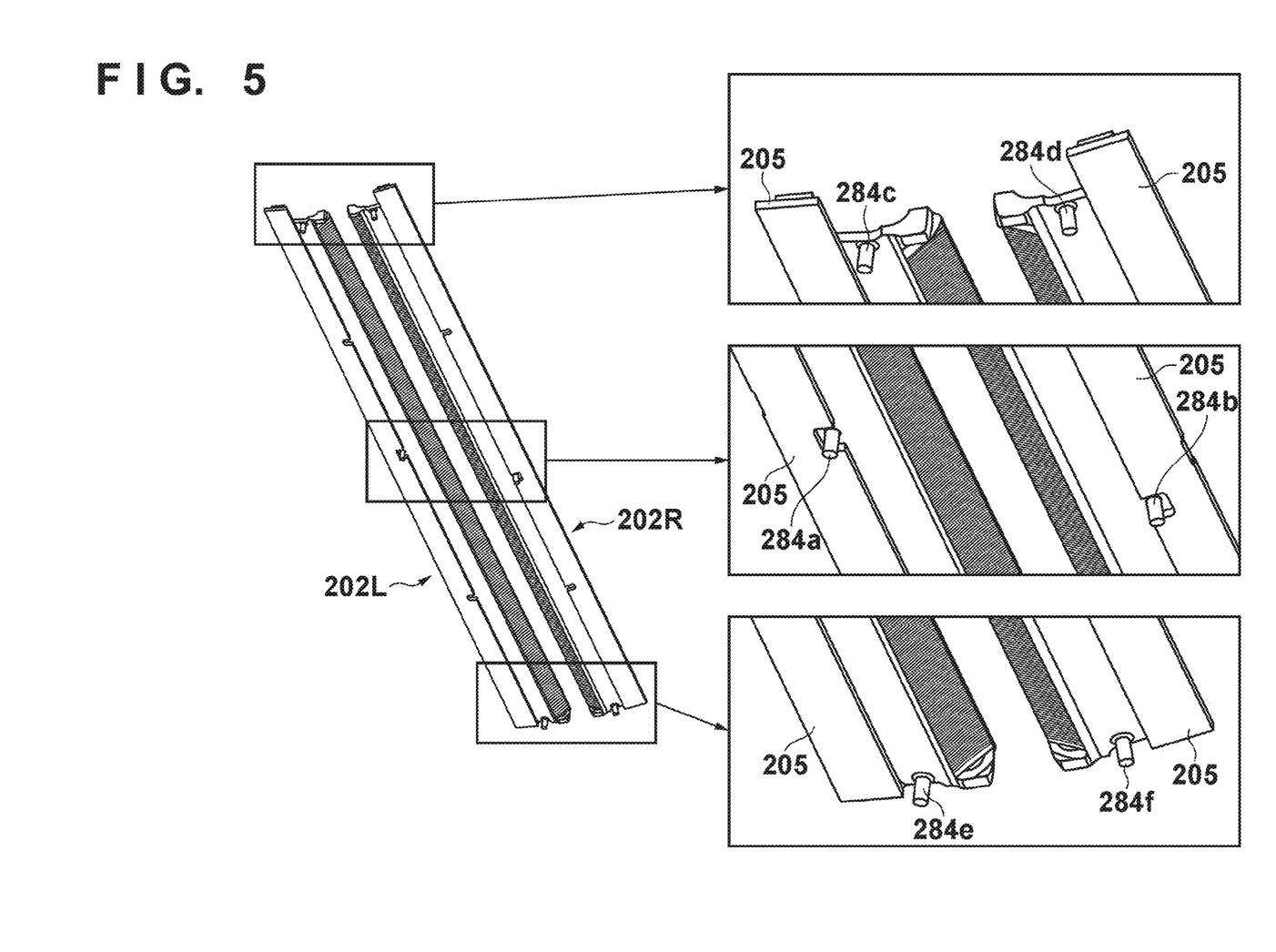
FIG. 5 is a perspective view illustrating a bottom surface of the light guide unit.

Adjusting the positions of the light guide units 202L and 202R relative to the base portion 201, and fixing the light guide units 202L and 202R onto the base portion 201, will be described using FIGS. 5 through 7B. FIG. 5 is a perspective view illustrating the light guide units 202L and 202R from the bottom surfaces thereof. In FIG. 5, a plurality of bosses used for alignment are provided in the light guides 208 of the light guide units 202L and 202R, respectively. Boss portions 284a and 284b are provided in a central area of the light guides 208 in the longitudinal direction thereof, and boss portions 284c, 284d, 284e, and 284f are provided on both ends of the light guides 208 in the longitudinal direction thereof. The boss portions 284a, 284b, 284c, 284d, 284e, and 284f may be formed as parts of the light guides 208, or may be manufactured through a separate process from the light guides 208 and fixed thereto through bonding. Note that opening portions such as holes, grooves, or slits that correspond to the boss portions 284a and 284b are provided in the metallic plate member 205. These are to ensure that the boss portions 284a and 284b and the metallic plate member 205 do not interfere with each other. The opening portions may be unnecessary depending on the positions of the boss portions 284a and 284b. For example, no opening portions are provided on both ends of the plate member 205 because the boss portions 284c, 284d, 284e, and 284f are present in locations that do not interfere with the metallic plate member 205.

Figure 6:
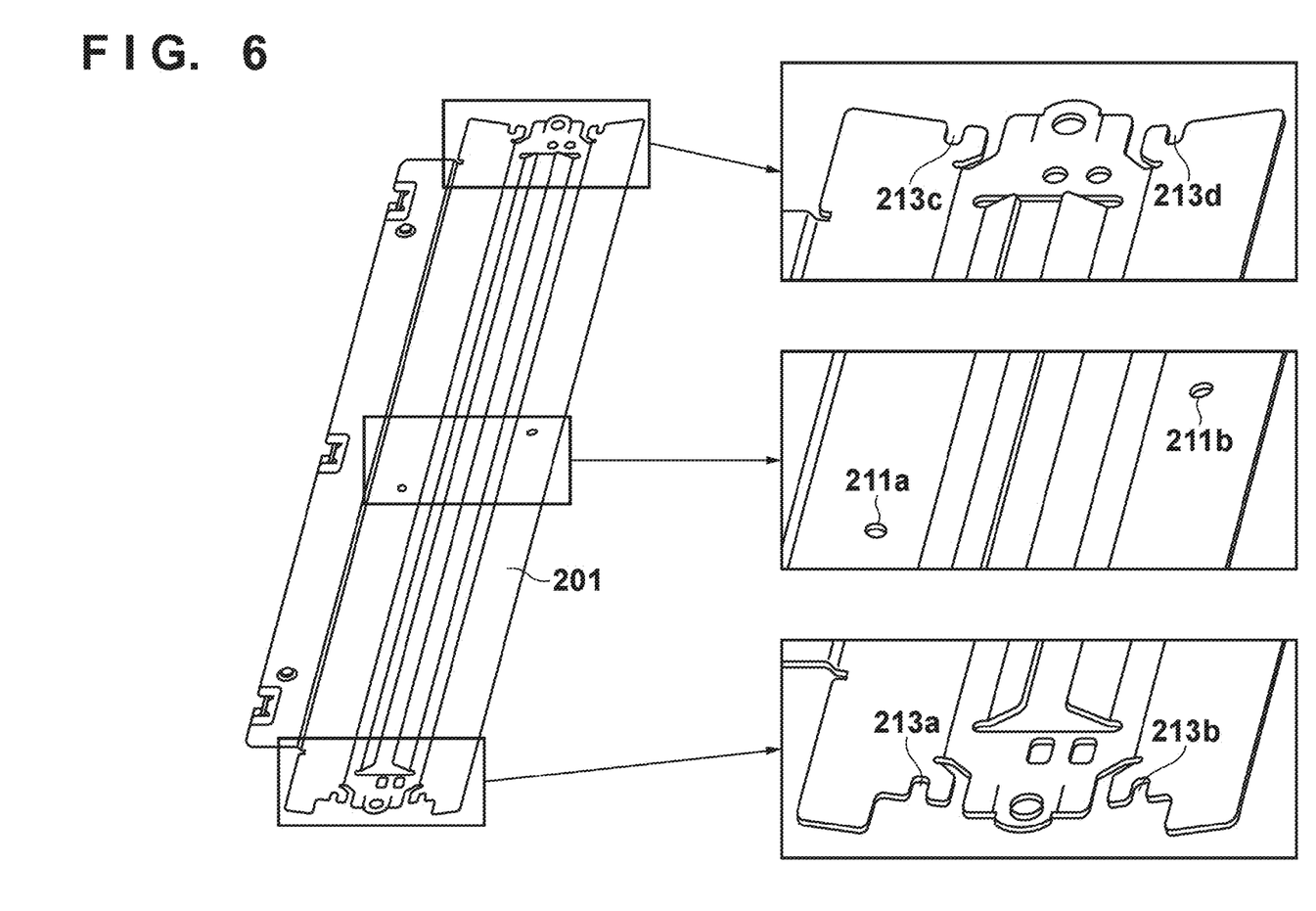
FIG. 6 is a perspective view illustrating a top surface of a base portion.

As shown in FIG. 6, round hole portions 211a and 211b are provided near the center of the base portion 201, and slit portions 213a, 213b, 213c, and 213d are provided on both ends of the base portion 201. When the base portion 201 and the light guide units 202L and 202R are combined, the boss portions in the light guide units are aligned with the corresponding opening portions (round hole portions or slit portions) in the base portion. The boss portion 284a is inserted into the round hole portion 211a. The boss portion 284b is inserted into the round hole portion 211b. The boss portion 284c is inserted into the slit portion 213a. The boss portion 284d is inserted into the slit portion 213b. The boss portion 284e is inserted into the slit portion 213c. The boss portion 284f is inserted into the slit portion 213d.

Figure 7A:
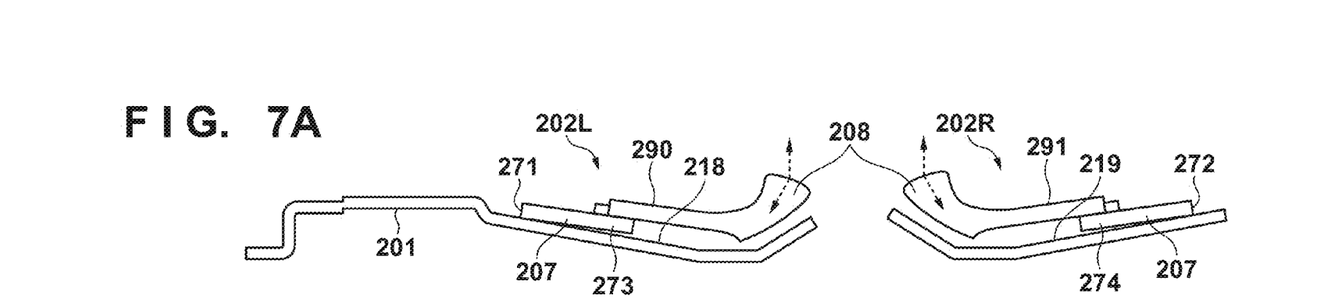
FIGS. 7A and 7B are diagrams illustrating a state in which the base portion and the light guide unit have been combined.

As shown in FIG. 7A, ridgelines 271 and 272, which each correspond to one side of each LED substrate 207 of the respective light guide units 202L and 202R parallel to the direction in which the plurality of LEDs are laid out, make contact with top surfaces 218 and 219 of the base portion 201, respectively. During assembly, the light guide unit 202L can be rotated relative to the base portion 201 with the ridgeline 271 serving as a center of rotation. Likewise, the light guide unit 202R can be rotated relative to the base portion 201 with the ridgeline 272 serving as a center of rotation. In this manner, the ridgelines 271 and 272 serve both as contact axes (contact lines) and axes of rotation. The light guides 208 rotate in the directions of the dotted line arrows as a result of the light guide units 202L and 202R rotating with the ridgelines 271 and 272 serving as the axes of rotation. The directions in which light is emitted from the light guides 208 (the optical axes) can be adjusted by rotating the light guide units 202L and 202R.

As shown in FIG. 7A, bottom surfaces 273 and 274 of the LED substrates 207 are at an angle relative to the top surfaces 218 and 219 of the base portion 201. This angle is, for example, 3 to 5°. Due to dimension tolerances of the respective components, it is possible that the light guides 208 and the base portion 201 will interfere with each other when adjusting the amount by which the light guide units 202L and 202R are rotated. The stated angles are set so that such interference does not occur.

Figure 7B:
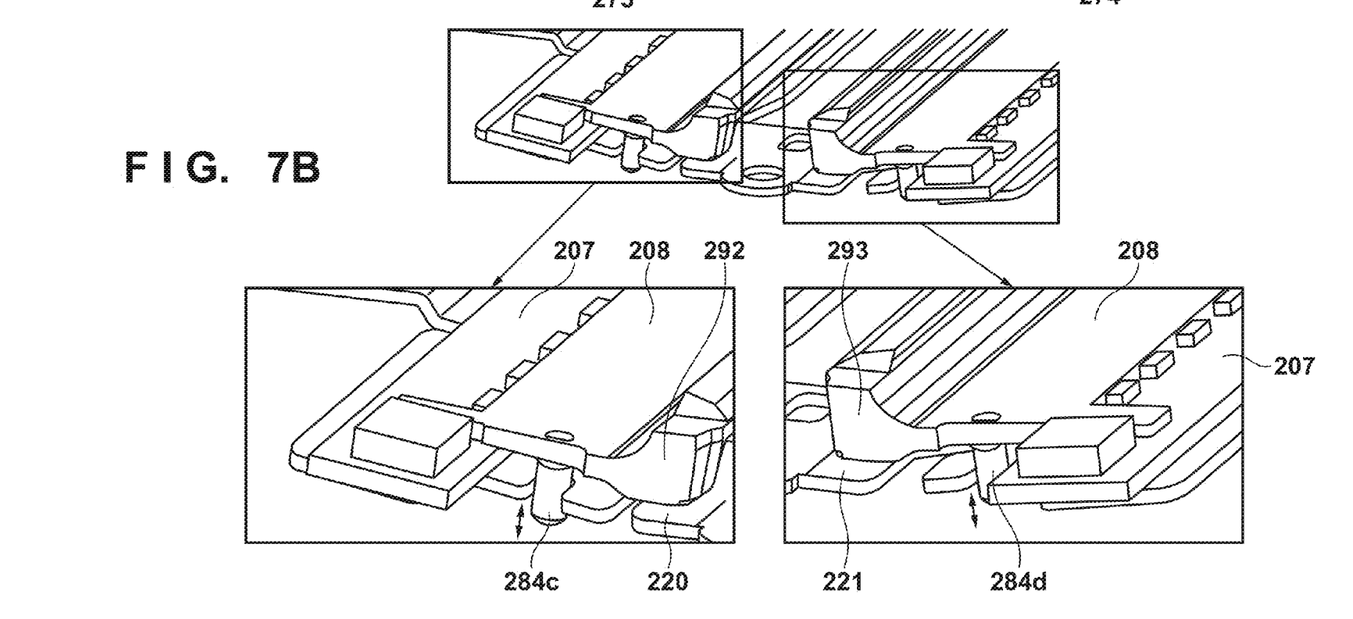

As shown in FIGS. 7A and 7B, the amounts by which the light guide units 202L and 202R are rotated is adjusted using a tool during assembly, so that the angles (measurement values) of top surfaces 290 and 291 of the light guides 208 in the light guide units 202L and 202R fall within a predetermined range from a design value. Here, the measurement of the angles of the top surfaces 290 and 291 of the light guides 208 is carried out at a plurality of locations in the longitudinal direction (the vertical direction relative to the paper surface in FIG. 7A). The rotation amount of the light guide units 202L and 202R is adjusted so that all of the angles fall within a predetermined range from a design value across the entire range of the longitudinal direction.

Figure 8A:
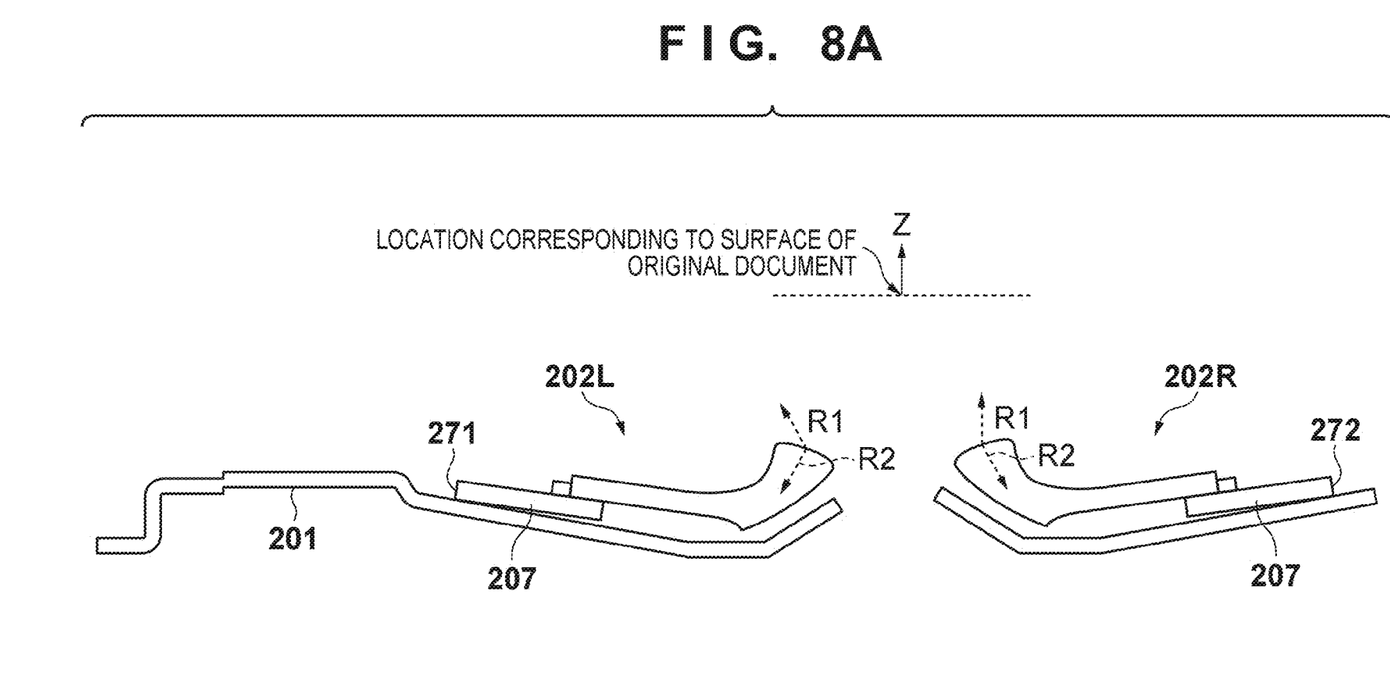
FIG. 8A is a diagram illustrating how the position of the light guide unit relative to the base portion is adjusted.

When the stated adjustment of the angles is finished, fine adjustments of the angles for the purpose of adjusting a light amount are carried out. As shown in FIG. 8A, a light amount in the Z direction (the upward direction) from a location corresponding to the surface of the original document (the surface to be read) is measured at a reading location corresponding to a given location in the longitudinal direction of the light guides.

Figure 8B:
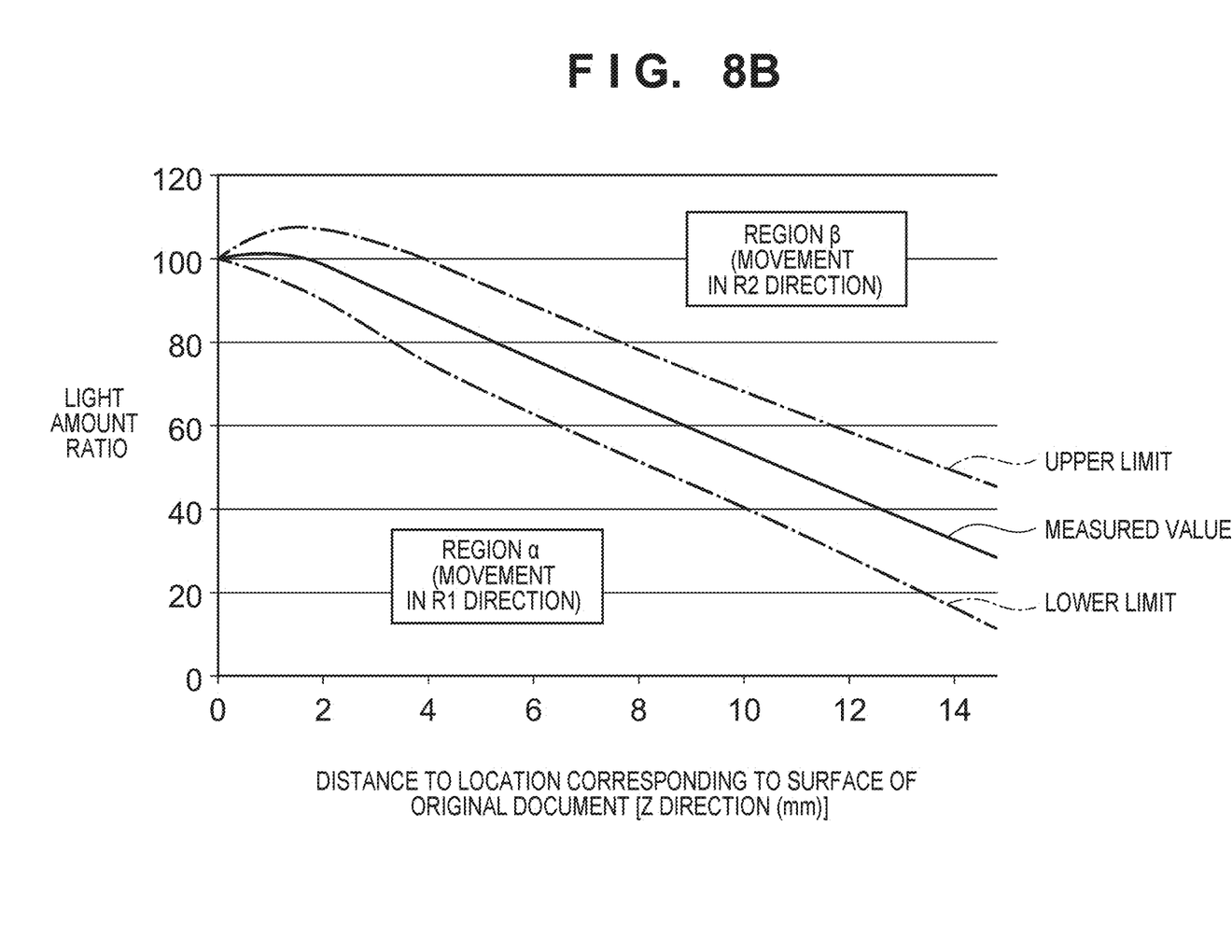
FIG. 8B is a diagram illustrating a ratio of a light amount to a distance from a location corresponding to the original document surface.

In FIG. 8B, the horizontal axis represents a distance from the location corresponding to the original document surface, whereas the vertical axis represents a light amount ratio. The light amount ratio is a ratio of a measured light amount relative to the light amount at the location corresponding to the original document surface. Here, the light amount at the location corresponding to the original document surface is taken as 100. Here, the light guide units 202L and 202R are rotated so that the measured value falls within a range from an upper limit and a lower limit for the design. For example, in the case where the measured value exceeds the upper limit, the light guide units 202L and 202R are rotated in an R2 direction. Likewise, in the case where the measured value is below the lower limit, the light guide units 202L and 202R are rotated in an R1 direction. The light amount is measured at a plurality of locations in the longitudinal direction, and fine adjustments are made to the angles of the light guide units 202L and 202R so that the light amounts at all locations fall within the range for the design.

As shown in FIG. 7B, a gap is provided by design between leg portions 292 and 293 of the light guides 208 and top surfaces 220 and 221 of the base portion 201. The configuration is the same on the opposite sides of the light guides 208 in the longitudinal direction. The fine adjustment of the angles is realized by adjusting the size of this gap. The light guide units 202L and 202R whose angles have been set are fixed to the base portion 201 using a bonding agent such as a UV bonding agent. The locations of the bond are, for example, the locations indicated by the circles 154 in FIG. 3A.

According to the present embodiment, the plurality of LEDs 204 are mounted upon the metallic plate member 205, and thus heat from the plurality of LEDs 204 is transmitted to the metallic plate member 205 and the plate member 205 functions as a heat radiating plate. Accordingly, a rise in the temperature of the plurality of LEDs 204 can be efficiently suppressed. In addition, the light guides 208 are fixed upon the metallic plate member 205 so that the surfaces of the light guides 208 and the metallic plate member 205 that face each other are parallel to each other. Consequently, the light guides 208 are suppressed from warping. Because the light guides 208 are suppressed from warping, the distance between the light guides 208 and the original document is maintained at a desired distance, which in turn makes it difficult for fogging, shininess, and so on to occur in the image resulting from the reading.

In the present embodiment, the surfaces of the light guides 208 and the metallic plate member 205 that face each other are stuck to each other using an adhesive member. Consequently, the light guides 208 are suppressed from warping over an extended period of time. In addition, because the material of the light guides 208 (plastic) has a sufficiently lower rigidity than the material of the plate member 205 (metal), warpage in the light guides 208 is corrected by the plate member 205. Double-stick tape in which an adhesive material coating is made on both sides, a bonding agent, or the like can be employed as the adhesive member. In particular, the double-stick tape can immediately fix the surfaces of the light guides 208 and the metallic plate member 205 that face each other, and is thus advantageous in terms of workability.

In addition, in the present embodiment, the angles of the light guide units 202L and 202R are adjusted in a state in which the light guides 208 are maintained straight by fixing the light guides 208 to the metallic plate member 205 in this manner. Here, the light guide units 202L and 202R are supported by the base portion 201. Of the plurality of surfaces that make up the metallic plate member 205 in the light guide units 202L and 202R, the plurality of LEDs 204 are provided on a first surface. Meanwhile, part (one side) of a second surface, which corresponds to the surface on the opposite side as the first surface, makes contact with the base portion 201. The axis of contact between the metallic plate member 205 and the base portion 201 is parallel to the longitudinal direction of the light guide units 202L and 202R. According to the present embodiment, the axis of contact is formed by contact between the ridgelines 271 and 272 on the end portions of the metallic plate member 205 that are elongated in the longitudinal direction and the base portion 201. The axis of contact being realized by the ridgelines 271 and 272 is advantageous in that no special processing need be performed on the base portion 201. The optical axes (angles) of the light guides 208 are adjusted by rotating the light guide units 202L and 202R relative to the base portion 201 using the axis of contact as the rotational axis. Meanwhile, fine adjustments can be made to the angles by adjusting the gap that arises between the metallic plate member 205 and the base portion 201. At this time, the gap is adjusted by measuring the light amount at several locations along the longitudinal direction of the light guide units 202L and 202R so that image problems such as fogging, shininess, and so on do not easily arise. The light guide units 202L and 202R are then fixed to the base portion 201 using a bonding agent or the like while maintaining the stated gap.

Variations

Shape of Base Portion 201

Figure 9:
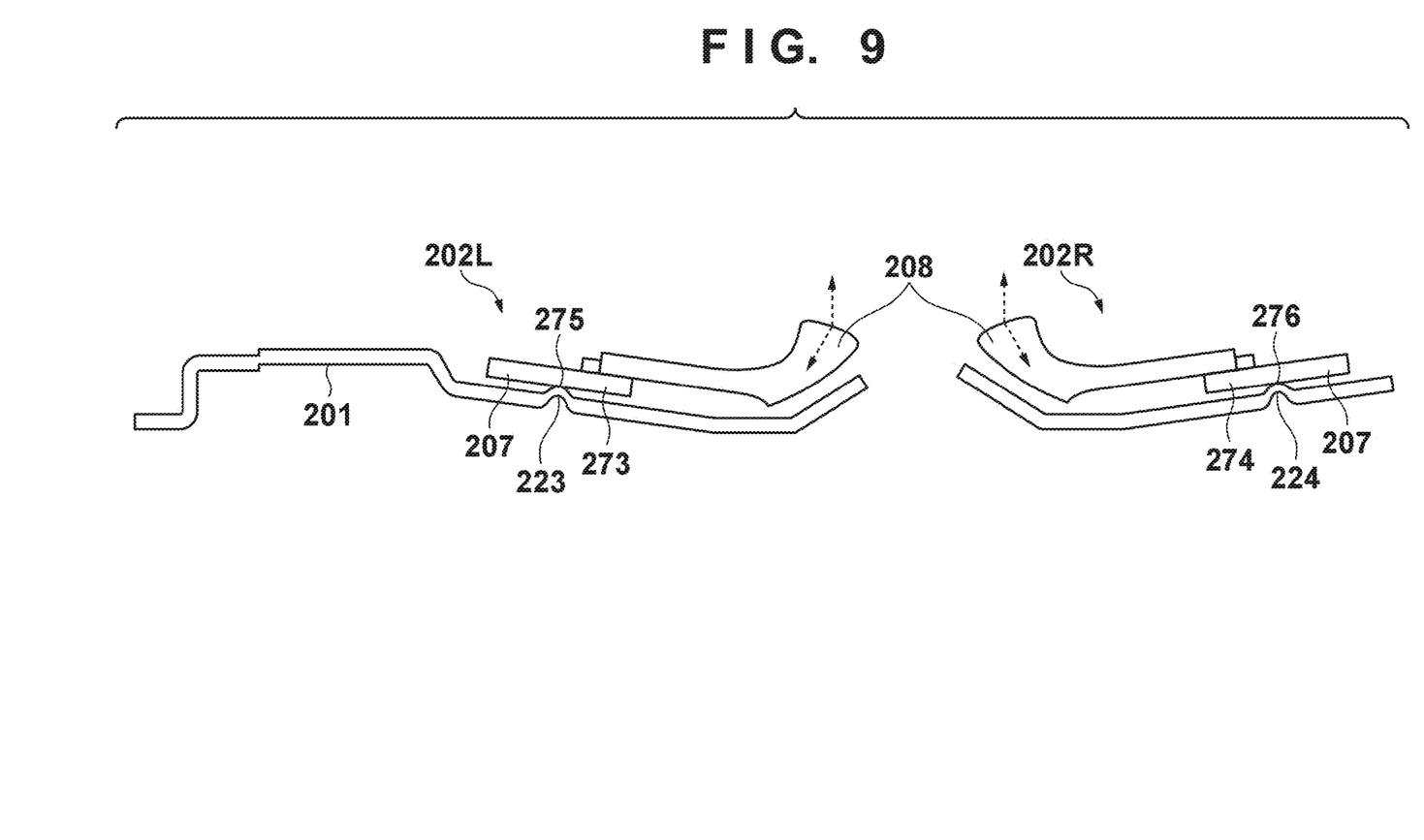
FIG. 9 is a diagram illustrating a state in which the base portion and the light guide unit have been combined.

Although the ridgelines 271 and 272 at the longitudinal ends of the LED substrate 207 are indicated as being an axis of contact (rotational axis) in FIG. 7A, an axis of contact may be provided at another location. As shown in FIG. 9, rib portions 223 and 224 may be provided as protruding portions that protrude toward the LED substrate 207 in the longitudinal direction of the base portion 201. The bottom surfaces 273 and 274 of the LED substrate 207 make contact with the rib portions 223 and 224. Accordingly, the angles of the light guide units 202L and 202R relative to the base portion 201 can be adjusted using contact portions (contact axes 275 and 276) that are elongated linearly in the longitudinal direction of the base portion 201 as rotational centers.

The configuration illustrated in FIG. 9 makes it easier to ensure the straightness, in the longitudinal direction, of the areas where the base portion 201 and the LED substrate 207 make contact, as compared to the configuration illustrated in FIG. 7A. With respect to the base portion 201 illustrated in FIG. 7A, it is necessary to achieve the straightness on the top surfaces 218 and 219. However, with the base portion 201 illustrated in FIG. 9, the straightness needs to be achieved only at the locations of the rib portions 223 and 224. Accordingly, it can be said that the configuration illustrated in FIG. 9 makes it easier to ensure straightness than the configuration illustrated in FIG. 7A.

Fixing of LED Substrate 207 and Light Guides 208

Figure 4D:
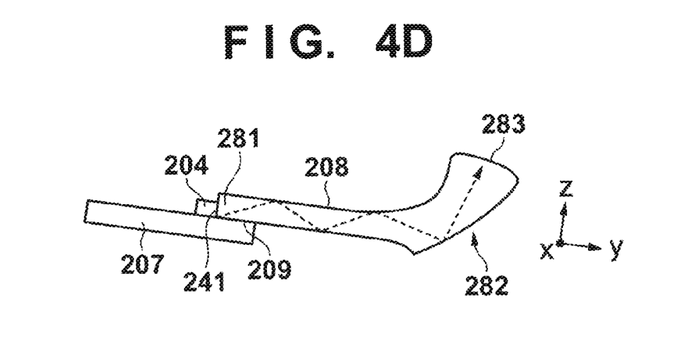
Figure 10A:
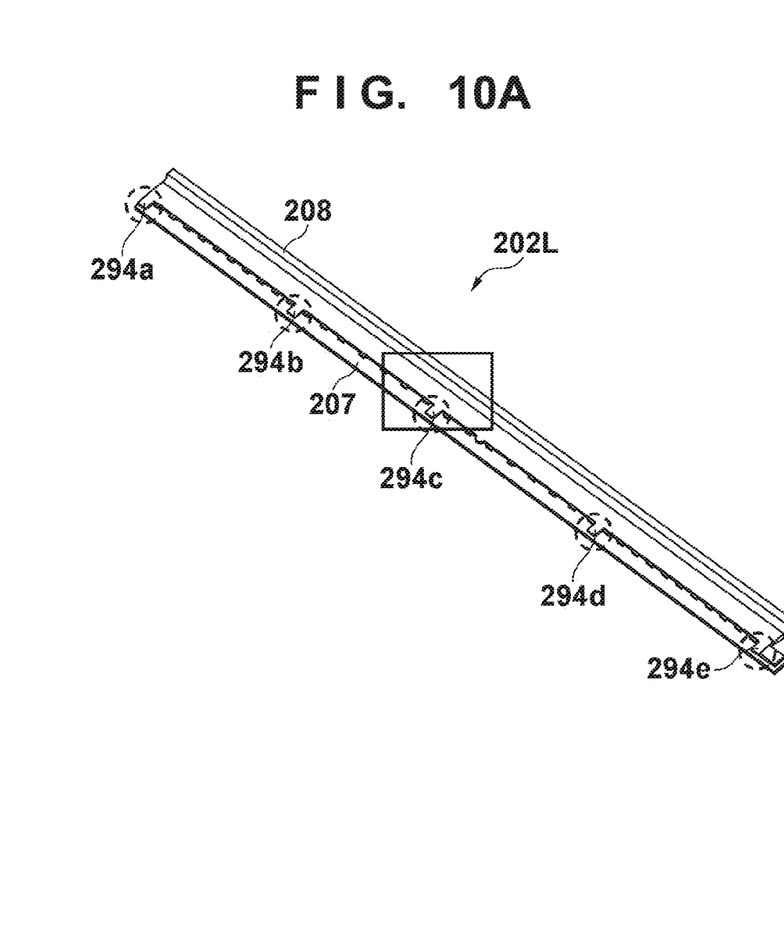
FIGS. 10A and 10B are diagrams illustrating a procedure for fixing the light guide to a plate member.
Figure 10B:
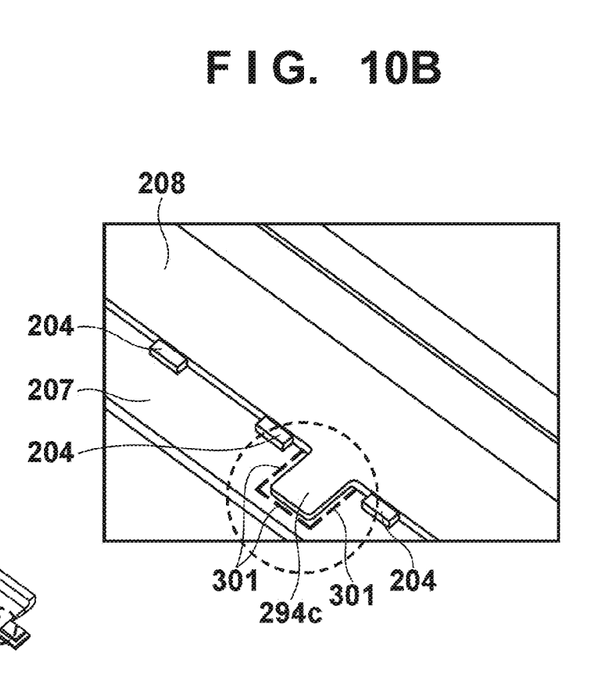

Although FIG. 4D illustrates the LED substrate 207 and the light guides 208 as being fixed using the double-stick tape 209, another fixing method may of course be employed. As shown in FIG. 10A, flange parts 294a, 294b, 294c, 294d, and 294e that protrude along the top portion of the LED substrate 207 are provided in the light guides 208. Furthermore, as shown in FIG. 10B, a bold dotted line portion 301 is coated with a bonding agent (a UV bonding agent or the like). Accordingly, the flange part 294c of the light guides 208 can be affixed to the top surface of the LED substrate 207. The other flange parts 294a, 294b, 294d, and 294e are fixed to the top surface of the LED substrate 207 in the same manner.

In this manner, the one or more flange part 294c is provided at an end of the light guides 208 elongated in the longitudinal direction thereof that faces the plurality of LEDs 204, and the flange part 294c is then fixed to the metallic plate member 205. Compared to the fixing method illustrated in FIGS. 4A through 4D, which uses the double-stick tape 209, the fixing method illustrated in FIGS. 10A and 10B, which uses a bonding agent, is advantageous in terms of a reduction in the number of assembly steps as well as from the standpoint of automation. This is because the double-stick tape 209 requires processes for removing a paper liner, applying the tape, and so on.

Fixing of LED Substrate 207 and Light Guides 208

Figure 11:
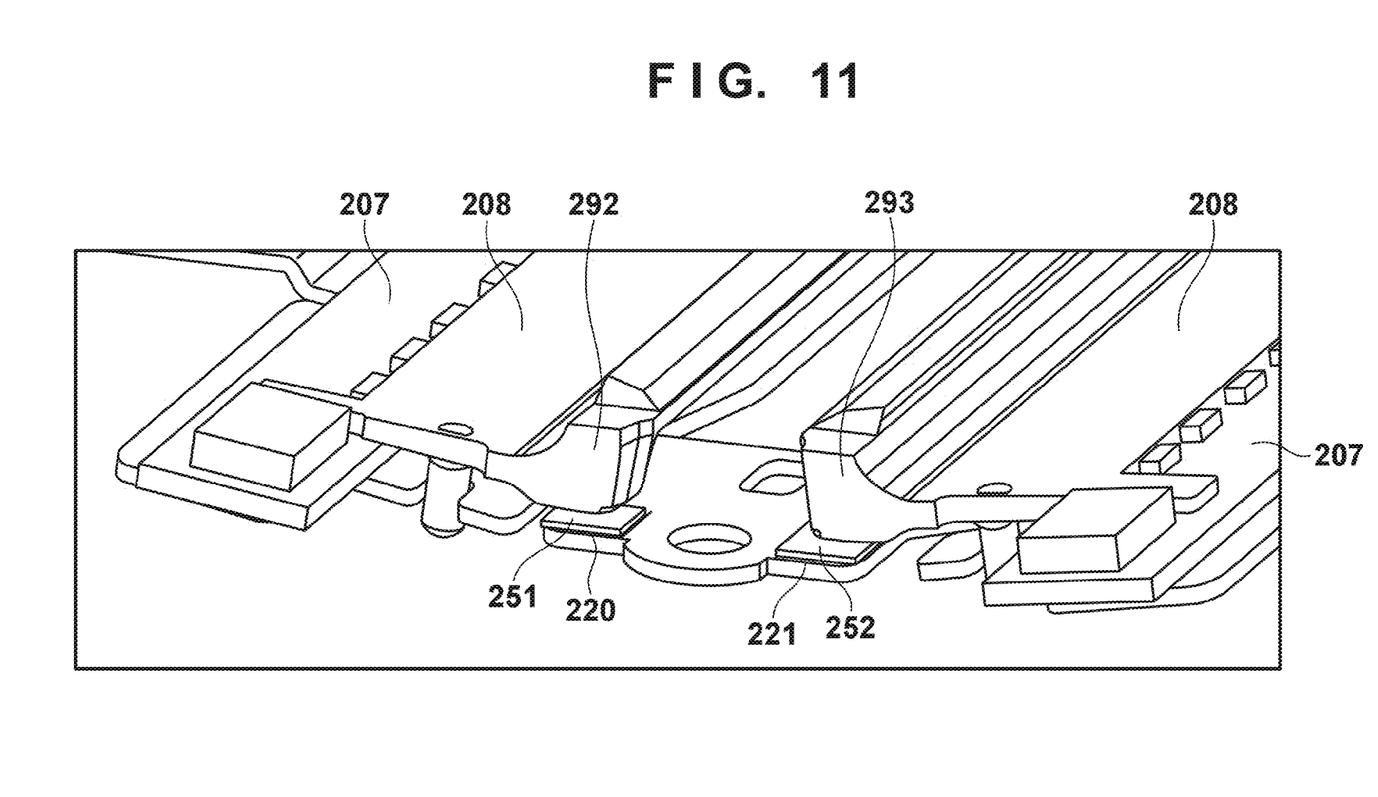
FIG. 11 is a diagram illustrating a procedure for adjusting the position of the light guide unit using sheet members.

FIG. 7B illustrates the adjustment of the angles of the light guide units 202L and 202R relative to the base portion 201 by providing a gap between the leg portions 292 and 293 of the light guides 208 and the top surfaces 220 and 221 of the base portion 201 and then adjusting that gap. However, sheet members 251 and 252 may be interposed between the leg portions 292 and 293 of the light guides 208 and the top surfaces 220 and 221 of the base portion 201, as shown in FIG. 11. Note that the sheet members 251 and 252 are fixed to the top surfaces 220 and 221 of the base portion 201 using double-stick tape, a bonding agent, or the like. The gap can then be adjusted by adjusting the number of sheet members 251 and 252, selecting the sheet members 251 and 252 that have appropriate thicknesses from among sheet members that have different respective thicknesses, and so on. Furthermore, the sheet members 251 and 252 can be fixed to the leg portions 292 and 293 of the light guides 208 while using the sheet members 251 and 252 to maintain the size of the gap with certainty. A UV bonding agent may be used for this fixing as well. In this manner, the height of the gap may be maintained by arranging the sheet members 251 and 252, which serve as height adjustment members, in the gap.

With the fixing method illustrated in FIG. 11, the bonding takes place with the light guides 208 and the base portion 201 coming in contact with each other. Accordingly, a higher bonding strength can be ensured as compared to the fixing method illustrated in FIG. 7B. This method is also advantageous in that shifting in the adjustment, which can occur due to vibrations imparted during transport, can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-095019, filed Apr. 18, 2012, which is hereby incorporated by reference herein in its entirety.

What is claimed is:

1. An original document reading apparatus which illuminates and reads an original document, comprising:
   a photoelectric conversion element configured to receive reflected light from the original document, and to convert the reflected light into an electrical signal,
   a metallic substrate;
   a plurality of light emitting elements mounted in an array on the metallic substrate;
   a light guide configured to guide light emitted from the plurality of light emitting elements toward the original document; and
   a base member configured to support the light guide,
   wherein a light incident surface of the light guide is configured to face light-emitting surfaces of the plurality of light emitting elements, and the light guide is fixed to the metallic substrate,
   wherein the plurality of light emitting elements are disposed on a first surface of the metallic substrate, and part of a second surface of the metallic substrate that is the reverse of the first surface contacts with the base member, and
   wherein the light guide is fixed to the base member after adjusting an optical axis of the light guide by rotating the light guide relative to the base member using the part of the second surface as a rotational axis.

2. The original document reading apparatus according to claim 1, wherein the light guide is fixed on the metallic substrate by an adhesive member.

3. The original document reading apparatus according to claim 2, wherein the adhesive member comprises double-stick tape that is coated on both sides with an adhesive material.

4. The original document reading apparatus according to claim 2, wherein the adhesive member comprises a bonding agent.

5. The original document reading apparatus according to claim 1, wherein the part of the second surface is a ridgeline at an end of the metallic substrate and that is elongated in the longitudinal direction of the metallic substrate.

6. The original document reading apparatus according to claim 1,
wherein the base member has a protruding portion, and
wherein the part of a second surface contacts with the protruding portion and that is elongated in the longitudinal direction of the metallic substrate.

7. The original document reading apparatus according to claim 1, wherein one or more flange parts are provided in an end of the light guide that is elongated in the longitudinal direction and that faces the plurality of light emitting elements, and the flange parts are fixed to the metallic substrate.

8. An original document reading apparatus which illuminates and reads an original document, comprising:
a photoelectric conversion element configured to receive reflected light from the original document, and to convert the reflected light into an electrical signal,
a metallic substrate;
a plurality of light emitting elements mounted in an array on the metallic substrate;
a light guide configured to guide light emitted from the plurality of light emitting elements toward the original document; and
a base member configured to support the light guide,
wherein a light incident surface of the light guide is configured to face light-emitting surfaces of the plurality of light emitting elements, and the light guide is fixed to the metallic substrate,
wherein the plurality of light emitting elements are disposed on a first surface of the metallic substrate, and part of a second surface of the metallic substrate that is reverse of the first surface contacts with the base member, and
wherein a gap arising between the metallic substrate and the base member is adjusted by rotating the light guide relative to the base member using the part of the second surface as a rotational axis.

9. The original document reading apparatus according to claim 8, wherein the light guide is fixed to the base member while maintaining the gap after the gap has been adjusted.

10. The original document reading apparatus according to claim 9, wherein a height adjustment member for maintaining the height of the gap is disposed in the gap.

11. The original document reading apparatus according to claim 10, wherein the height adjustment member comprises one or more sheet members and the light guide is bonded to the base portion along with the sheet members.

* * * * *